United States Patent
Lee et al.

(10) Patent No.: US 11,243,700 B2
(45) Date of Patent: Feb. 8, 2022

(54) MEMORY SYSTEM FOR CHANGING CELL MODE OF MEMORY BLOCK AND OPERATION METHOD THEREOF

(71) Applicant: SK hynix Inc., Gyeonggi-do (KR)

(72) Inventors: Geu-Rim Lee, Gyeonggi-do (KR); Young-Gyun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 68 days.

(21) Appl. No.: 16/575,601

(22) Filed: Sep. 19, 2019

(65) Prior Publication Data
US 2020/0174667 A1    Jun. 4, 2020

(30) Foreign Application Priority Data

Nov. 29, 2018  (KR) .......................... 10-2018-0150799

(51) Int. Cl.
*G06F 3/06*      (2006.01)
*G06F 12/02*     (2006.01)

(52) U.S. Cl.
CPC ............ *G06F 3/064* (2013.01); *G06F 3/0616* (2013.01); *G06F 3/0632* (2013.01); *G06F 3/0653* (2013.01); *G06F 3/0673* (2013.01); *G06F 12/023* (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 2010/0122016 A1* | 5/2010 | Marotta ................. | G11C 16/16 711/103 |
| 2018/0285258 A1* | 10/2018 | Muchherla .......... | G06F 12/0246 |
| 2019/0065366 A1* | 2/2019 | Muchherla ............ | G06F 3/0634 |
| 2019/0095116 A1* | 3/2019 | Igahara ................. | G06F 3/0619 |
| 2019/0146705 A1* | 5/2019 | Lin ....................... | G06F 3/0647 711/103 |

FOREIGN PATENT DOCUMENTS

| | | |
|---|---|---|
| KR | 10-2013-0050586 | 5/2013 |
| KR | 10-2018-0012653 | 2/2018 |
| KR | 1020180012653 | * 2/2018 |

OTHER PUBLICATIONS

X. Dong and Y. Xie, "AdaMS: Adaptive MLC/SLC phase-change memory design for file storage," 16th Asia and South Pacific Design Automation Conference (ASP-DAC 2011), Yokohama, 2011, pp. 31-36 (Year: 2011).*

* cited by examiner

*Primary Examiner* — Edward J Dudek, Jr.
*Assistant Examiner* — Ralph A Verderamo, III
(74) *Attorney, Agent, or Firm* — IP & T Group LLP

(57) ABSTRACT

A memory system may include: a memory device including a plurality of memory blocks which includes memory cells supporting a two-or-more-level cell (XLC) mode and a single level cell (SLC) mode; and a controller suitable for managing data of the memory device and controlling the memory device, wherein, when memory usage of the memory device is greater than or equal to a first threshold value, the controller selects one or more free memory blocks as one or more victim memory blocks, switches a mode of each victim memory block to the XLC mode, and moves data stored in a source memory block to the one or more victim memory blocks, wherein the source memory block, among the plurality of memory blocks, has data stored therein driven in the SLC mode.

16 Claims, 16 Drawing Sheets

MEMORY SYSTEM FOR CHANGING CELL MODE OF MEMORY BLOCK AND OPERATION METHOD THEREOF

CROSS-REFERENCE TO RELATED APPLICATION

This application claims priority under 35 U.S.C. § 119 to Korean Patent Application No. 10-2018-0150799, filed on Nov. 29, 2018, which is incorporated herein by reference in its entirety.

BACKGROUND

1. Field

Exemplary embodiments relate to a memory system and an operation method thereof, and more particularly, to an operation method of the memory system capable of extending the lifetime of overall system.

2. Discussion of the Related Art

The computer environment paradigm has become ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems generally provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments are directed to a memory system and an operation method thereof.

In an embodiment, a memory system may include: a memory device comprising a plurality of memory blocks, which includes memory cells supporting a two-or-more-level cell (XLC) mode and a single level cell (SLC) mode; and a controller suitable for managing data of the memory device and controlling the memory device, wherein when memory usage of the memory device is greater than or equal to a first threshold value, the controller selects one or more free memory blocks as one or more victim memory blocks, switches a mode of each victim memory block to the XLC mode, and moves data stored in a source memory block to the one or more victim memory blocks, wherein the source memory block, among the plurality of memory blocks, has data stored therein driven in the SLC mode.

In an embodiment, an operation method of a memory system which includes a memory device including a plurality of memory blocks, which includes memory cells supporting a two-or-more-level cell (XLC) mode and an single level cell (SLC) mode, and a controller suitable for controlling the memory device, the operation method may include: monitoring memory usage of the memory device and access information of the plurality of memory blocks; selecting one or more free memory blocks as one or more victim memory blocks, when the memory usage is greater than or equal to a first threshold value; switching a mode of each of the one or more victim memory blocks from the SLC mode to the XLC mode; and moving data stored in a source memory block to the one or more victim memory blocks.

A memory system includes: a memory device including a plurality of memory blocks, which includes memory cells supporting a two-or-more-level cell (XLC) mode and a single level cell (SLC) mode; and a controller suitable for: controlling the memory blocks to be operated in the SLC mode; and when valid data of the memory blocks is greater than a threshold value, controlling at least one free block of the memory blocks to be operated in the XLC mode.

DETAILED DESCRIPTION

Figure 1:
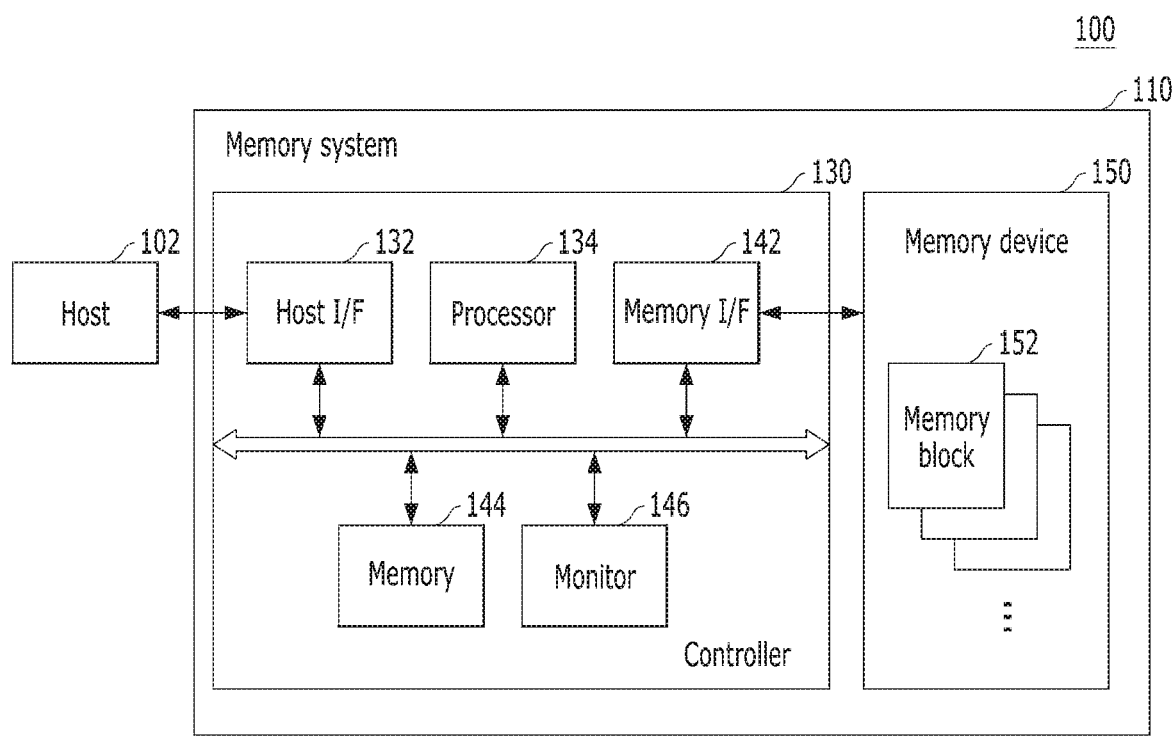
FIG. 1 is a block diagram illustrating a data processing system including a memory system in accordance with an embodiment of the present invention.

Various embodiments of the present invention are described below in more detail with reference to the accompanying drawings. However, various elements and features of the present invention may be configured or arranged differently than shown in the described embodiments, as will be apparent to those skilled in the art in light of this disclosure. Thus, the present invention is not limited to the embodiments set forth herein. Rather, the described embodiments are provided so that this disclosure is thorough and complete and fully conveys the present invention to those skilled in the art to which this invention pertains. Moreover, reference to "an embodiment" does not necessarily mean only one embodiment, and different references to "an embodiment" are not necessarily to the same embodiment(s). Throughout the disclosure, like reference numerals refer to like parts throughout the various figures and embodiments of the present invention.

It will be understood that, although the terms "first", "second", "third", and so on may be used herein to identify various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate various features of the disclosed embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to limit the present invention. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Various embodiments of the present invention are described in detail with reference to the attached drawings.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The memory system 110 may operate to store data for the host 102 in response to a request of the host 102. Non-limiting examples of the memory system 110 include a solid state drive (SSD), a multi-media card (MMC), a secure digital (SD) card, a universal serial bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC, and the. The SD card may include a mini-SD card and micro-SD card.

The memory system 110 may be embodied by various types of storage devices. Examples of such storage devices may include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 may be improved. Alternatively, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 each of which may include a plurality of pages, and each of the pages may include a plurality of memory cells coupled to a word line. In an embodiment, the memory device 150 may be a flash memory. The flash memory may have a 3-dimensional (3D) stack structure.

Since the structure of the memory device 150 including its 3D stack structure is described in detail below with reference to FIGS. 2 to 4, further description of these elements and features is omitted here.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, program and erase operations of the memory device 150.

The controller 130 may include a host interface (I/F) 132, a processor 134, a memory interface (I/F) 142, a memory 144, and a monitor 146, all operatively coupled via an internal bus.

The host interface 132 may be configured to process a command and data of the host 102, and may communicate with the host 102 through one or more of various interface protocols, such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven through firmware referred to as a host interface layer (HIL) in order to exchange data with the host.

The memory interface 142 may serve as a memory/storage interface for interfacing the controller 130 and the memory device 150 such that the controller 130 controls the memory device 150 in response to a request from the host 102. When the memory device 150 is a flash memory or specifically a NAND flash memory, the memory interface 142 may generate a control signal for the memory device 150 and process data to be provided to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150. The memory interface 142 may be driven through firmware referred to as a flash interface layer (FIL) in order to exchange data with the memory device 150.

The memory 144 may serve as a working memory of the memory system 110 and the controller 130, and store data for driving the memory system 110 and the controller 130. The memory 144 may be embodied by a volatile memory. For example, the memory 144 may be embodied by a static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

As described above, the memory 144 may store data required for performing a data write/read operation between the host and the memory device 150 and data when the data write/read operation is performed. In order to store such data, the memory 144 may include a program memory, data memory, write buffer/cache, read buffer/cache, data buffer/cache, map buffer/cache or the like.

The memory 144 may store a bitmap indicating the states of memory cell modes of the plurality of memory blocks included in the memory device 150. In various embodiments, the memory device 150 may include a plurality of memory blocks, which includes memory cells supporting a multi-level cell (MLC) mode and a single level cell (SLC) mode. When a first memory block is driven in the SLC mode, a bitmap value corresponding to the first memory block may be '0'. Afterwards, when the first memory block is driven in the MLC mode (for example, a triple level cell mode), a bitmap value corresponding to the first memory block may be updated into '1'.

The monitor 146 may periodically monitor the usage of the memory device 150. In particular, the monitor 146 may monitor the memory usage of valid data stored in the memory device 150. When the memory usage of the valid data stored in the memory device 150 is greater than or equal to a first threshold value, the monitor 146 may provide the memory usage information to the processor 134. For example, when valid data of '8 GB' are stored in the memory device 150 having a total capacity of '16 GB' in the case that the first threshold value is '8 GB', the monitor 146 may provide the current memory usage information of the memory device 150 to the processor 134.

The monitor 146 may monitor access information of the plurality of memory blocks in the memory device 150. The access information may indicate the number of times that the memory system 110 accesses corresponding data per unit time or the amount of time required for the memory system 110 to access the corresponding data. For example, when the memory system 110 reads data stored in a target block 60 times per second, access information corresponding to the target block may be '60'. However, this is only an example, and the present invention is not limited thereto.

The monitor 146 may determine a cold block among the plurality of memory block in the memory device 150, under control of the processor 134. For example, the monitor 146 may determine that a block whose access information has a value less than a threshold value is a cold block. Such threshold value may be predetermined. For another example, the monitor 146 may determine that a memory block which stores sequential data having a value greater than or equal to a threshold value is a cold block.

The monitor 146 may periodically update the access information of the respective memory blocks of the memory device 150, under control of the processor 134. Then, the monitor 146 may provide the access information to the processor 134.

The processor 134 may control overall operations of the memory system 110. In particular, the processor 134 may control a program operation or read operation on the memory device 150 in response to a write request or read request from the host 102. The processor 134 may drive firmware referred to as a flash translation layer (FTL), in order to control overall operations of the memory system 110. The processor 134 may be implemented as a microprocessor or a central processing unit (CPU).

The controller 130 may perform an operation requested by the host 102 in the memory device 150 through the processor 134. In other words, the controller 130 may perform a command operation corresponding to a command received from the host 102 with the memory device 150. Furthermore, the controller 130 may perform a background operation on the memory device 150. The background operation on the memory device 150 may include a garbage collection (GC) operation, a wear leveling (WL) operation, a map flush operation, a bad block management operation and the like.

When the memory usage of valid data stored in the memory device 150 is less than the first threshold value, the processor 134 may program data to the memory device 150 in the SLC mode. Specifically, the processor 134 may provide the memory device 150 with a program command with data to be programmed. In particular, the program command may include an SLC mode signal. The processor 134 may control the memory device 150 to drive a target memory block in the SLC mode, using the SLC mode signal.

When the memory usage of the valid data stored in the memory device 150 is greater than or equal to the first threshold value, the processor 134 may move data stored in a memory block driven in the SLC mode to a memory block driven in an two-or-more-level cell (XLC) mode, which represents any of an MLC mode, a TLC mode, QLC mode, and higher level mode, where TLC denotes a triple level cell and QLC denotes a quad level cell. The memory block driven in the SLC mode may be referred to as an SLC memory block, and the memory block driven in the XLC mode may be referred to as an XLC memory block. Specifically, the processor 134 may control the memory device 150 to drive one or more memory blocks of free memory blocks in the XLC mode. The processor 134 may move data stored in the SLC memory block to the XLC memory block. In particular, the processor 134 may control the memory device 150 to mainly move data stored in a cold block of the SLC memory blocks to the XLC memory block. The data stored in the cold block may be referred to as cold data.

When the memory usage of the valid data stored in the memory device 150 is less than a second threshold value and data are stored in the XLC memory block, the processor 134 may control the memory device 150 to move some of the data stored in the XLC memory block to the SLC memory block.

The controller 130 may further include an error correction code (ECC) component, and a power management unit (PMU).

The ECC component may detect and correct an error contained in the data read from the memory device 150. In other words, the ECC component may perform an error correction decoding process to the data read from the memory device 150 through an ECC value used during an ECC encoding process. According to a result of the error correction decoding process, the ECC component may output a signal, for example, an error correction success/fail signal. When the number of error bits is more than a threshold value of correctable error bits, the ECC component may not correct the error bits, and may output an error correction fail signal.

The ECC component may perform error correction through a coded modulation such as Low Density Parity Check (LDPC) code, Bose-Chaudhri-Hocquenghem (BCH) code, turbo code, Reed-Solomon code, convolution code, Recursive Systematic Code (RSC), Trellis-Coded Modulation (TCM) and Block coded modulation (BCM). However, the ECC component is not limited to any specific structure. The ECC component may include any and all circuits, modules, systems or devices for error correction.

The PMU may provide and manage power of the controller 130.

The memory device 150 may receive a program command from the controller 130. As described above, the program command may include an SLC mode signal, an MLC mode signal and a TLC mode signal.

When the SLC mode signal is received from the controller 130, the memory device 150 may drive one or more free blocks of the plurality of memory blocks of the memory cell array 330 in the SLC mode, based on the received SLC mode signal. In order to store received data, in FIG. 3, the voltage supply 310 within the memory device 150 may generate a first program voltage, and the read/write circuit 320 may program the data to the memory block driven in the SLC mode, using the generated first program voltage.

A memory device of the memory system in accordance with an embodiment of the present invention is described in detail with reference to FIGS. 2 to 4.

Figure 2:
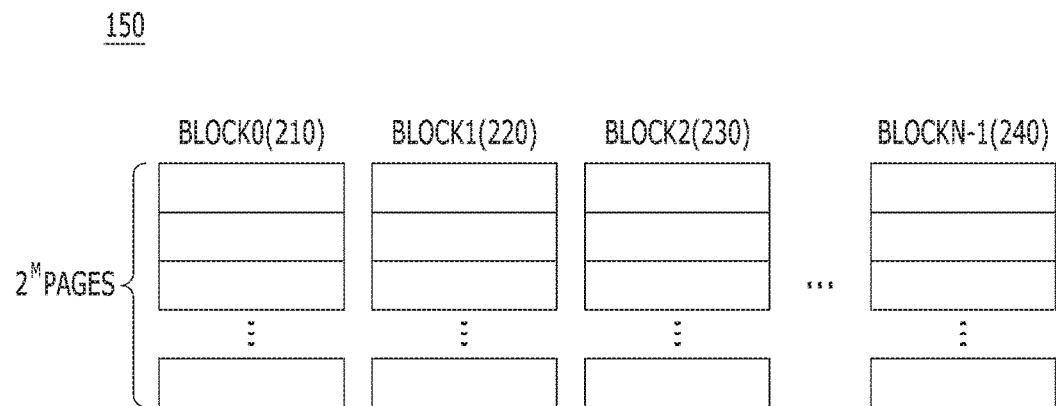
FIG. 2 is a schematic diagram illustrating a memory device employed in a memory system, e.g., the memory system of FIG. 1.

FIG. 2 is a schematic diagram illustrating the memory device 150 of FIG. 1. FIG. 3 is a circuit diagram illustrating a memory cell array of a memory block in the memory device 150. FIG. 4 is a schematic diagram illustrating an exemplary three-dimensional (3D) structure of the memory device 150.

Referring to FIG. 2, the memory device 150 may include a plurality of memory blocks, e.g., BLOCK0 (210), BLOCK1 (220), BLOCK2 (230), and to BLOCKN−1 (240). Each of the memory blocks 210, 220, 230 and 240 may include a plurality of pages, for example $2^M$ pages, the number of which may vary according to circuit design. For example, in some applications, each of the memory blocks may include M pages. Each of the pages may include a plurality of memory cells that are coupled to a word line WL.

The memory device 150 may include MLC memory blocks, triple level cell (TLC) memory blocks, quadruple level cell (QLC) memory blocks, and/or multiple level cell (MLC) memory blocks. Each of the MLC memory blocks includes a plurality of pages that are realized by memory cells capable of storing two-bit data in one memory cell. Each of the TLC memory blocks includes a plurality of pages that are realized by memory cells capable of storing three-bit data in one memory cell. Each of the QLC memory blocks includes a plurality of pages that are realized by memory cells capable of storing four-bit data in one memory cell. Higher level cell memory blocks, each of which includes a plurality of pages that are realized by memory cells capable of storing five or more-bit data in one memory cell, may also be employed.

In accordance with an embodiment of the present invention, the memory device 150 is described as a non-volatile memory, such as a flash memory, e.g., a NAND flash memory. However, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

The memory blocks 210 to 240 may store the data received from the host 102 through a program operation, and transfer data stored therein to the host 102 through a read operation.

Figure 3:
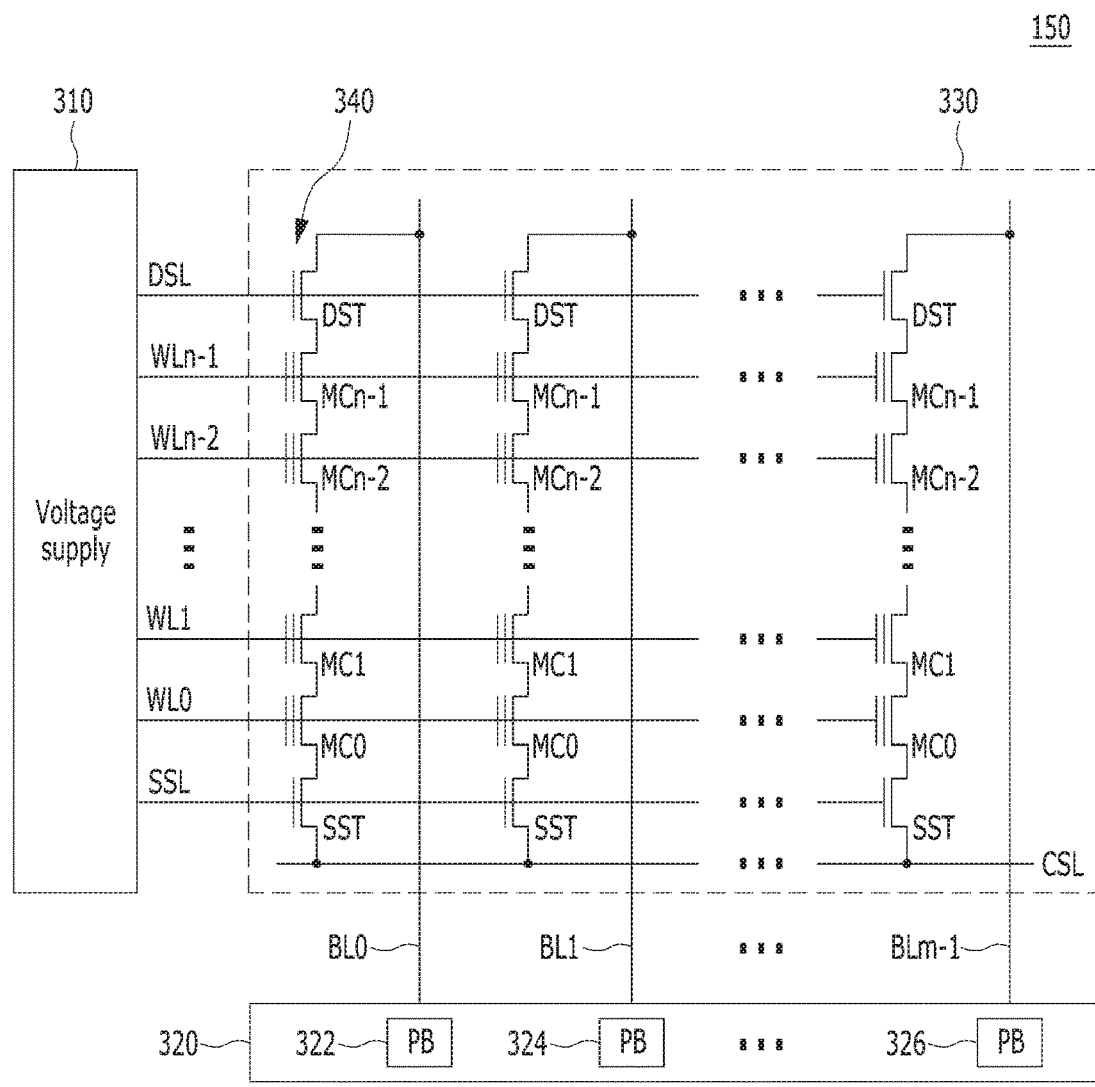
FIG. 3 is a circuit diagram illustrating a memory cell array of a memory block in a memory device.
Figure 4:
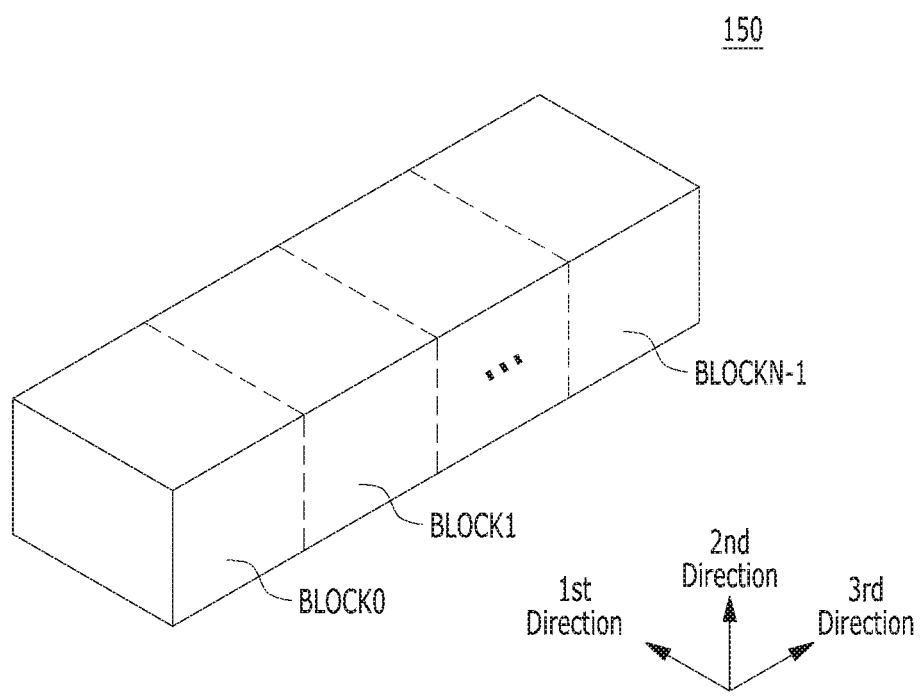
FIG. 4 is a block diagram illustrating an exemplary three-dimensional structure of the memory device in the memory system.

Referring to FIG. 3, the memory device 150 of the memory system 110 may include a memory block 330. The memory block 330 may correspond to any of the plurality of memory blocks 152 in the memory device 150. The memory block 330 may include a plurality of cell strings 340 coupled to a plurality of corresponding bit lines BL0 to BLm−1. The cell string 340 of each column may include one or more drain select transistors DST and one or more source select transistors SST. Between the drain and source select transistors DST and SST, a plurality of memory cells or memory cell transistors MC0 to MCn−1 may be coupled in series. In an embodiment, each of the memory cells MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1. For reference, in FIG. 3, 'DSL' denotes a drain select line, 'SSL' denotes a source select line, and 'CSL' denotes a common source line.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply 310 which provides word line voltages including a program voltage, a read voltage and a pass voltage to supply to the word lines according to an operation mode. The voltage generation operation of the voltage supply 310 may be controlled by a control circuit (not illustrated). Under the control of the control circuit, the voltage supply 310 may select one of the memory blocks (or sectors) of the memory cell array, select one of the word lines of the selected memory block, and provide the word line voltages to the selected word line and the unselected word lines as may be needed.

The memory device 150 may include a read and write (read/write) circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive, from a buffer (not illustrated), data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

The memory device 150 may be embodied by a two-dimensional (2D) or three-dimensional (3D) memory device. Particularly, as illustrated in FIG. 4, the memory device 150 may be embodied by a nonvolatile memory device having a 3D stack structure. When the memory device 150 has a 3D structure, the memory device 150 may include a plurality of memory blocks BLOCK0 to BLOCKN-1.

Each memory block 330 in the memory device 150 may include a plurality of NAND strings NS that are extended in the second direction, and a plurality of NAND strings NS (not shown) that are extended in the first direction and the third direction. Each of the NAND strings NS may be coupled to a bit line BL, at least one drain select line DSL, at least one source select line SSL, a plurality of word lines WL, at least one dummy word line DWL (not shown), and a common source line CSL, and each of the NAND strings NS may include a plurality of transistor structures.

In short, each memory block 330 of the memory device 150 may be coupled to a plurality of bit lines BL, a plurality of drain select lines DSL, a plurality of source select lines SSL, a plurality of word lines WL, a plurality of dummy word lines DWL, and a plurality of common source lines CSL. Each memory block 330 may include a plurality of NAND strings NS. In each memory block 330, one bit line BL may be coupled to a plurality of NAND strings NS to realize a plurality of transistors in one NAND string NS. A drain select transistor DST of each NAND string NS may be coupled to a corresponding bit line BL, and a source select transistor SST of each NAND string NS may be coupled to a common source line CSL. Memory cells MC may be provided between the drain select transistor DST and the source select transistor SST of each NAND string NS. In other words, a plurality of memory cells may be realized in each memory block 330 of the memory device 150.

Referring back to FIG. 1, the memory blocks 152 in the memory device 150 may operate in one of the SLC mode and the XLC mode. Alternatively, the memory device 150 may operate in a mode in which the SLC mode and the XLC mode are mixed. The XLC mode may include a multi-level cell (MLC) mode, a triple level cell (TLC) mode and a quadruple level cell (QLC) mode.

The SLC memory block may have a longer lifetime than the XLC memory block. That is, the SLC memory block may support a higher number of erase/write cycles (EW) than the XLC memory block. Furthermore, the SLC memory block may support the memory device 150 to perform a program operation and a read operation at higher speed than the XLC memory block. However, the SLC memory block may have a smaller data storage capacity than the XLC memory block.

For example, suppose that the number of memory blocks included in the memory device 150 is 100, the SLC memory block has a capacity of 4 MB and an EW of 30K, and the XLC memory block has a capacity of 12 MB and an EW of 3K.

When all of the memory blocks are SLC memory blocks, the memory device 150 may have an EW of '30K*100' and a data storage capacity of '4 MB*100'. In this case, the EW of the memory device 150 may have the maximum value, but the storage capacity of the memory device 150 may have the minimum value.

On the other hand, when all of the memory blocks are XLC memory blocks, the memory device 150 may have an EW of '3K*100' and a data storage capacity of '12 MB*100'. In this case, the storage capacity of the memory device 150 may have the maximum value, but the EW of the memory device 150 may have the minimum value.

That is, the advantages and disadvantages of the SLC memory block and the XLC memory block may have a trade-off relation.

For another example, when the memory blocks of the memory device 150 are divided into '10' SLC memory blocks and '90' XLC memory blocks, the memory device 150 may have an EW of '30K*10'+'3K*90' and a data storage capacity of '4 MB*10'+'12 MB*90'.

For another example, when the memory blocks of the memory device 150 are divided into '90' SLC memory blocks and '10' XLC memory blocks, the memory device 150 may have an EW of '30K*90'+'3K*10', and a data storage capacity of '4 MB*90'+'12 MB*10'.

As indicated by the four examples, the EW of the memory device 150 may be decided according to the SLC memory blocks, and the storage capacity of the memory device 150 may be decided according to the XLC memory blocks. Therefore, both of the SLC memory blocks and the XLC memory blocks need to be properly used in order to improve the performance of the memory system.

An embodiment provides a method capable of improving the performance of the memory system 110 by properly using the SLC memory blocks and the XLC memory blocks according to the characteristics of the SLC memory block and the characteristics of the XLC memory block.

Figure 5A:
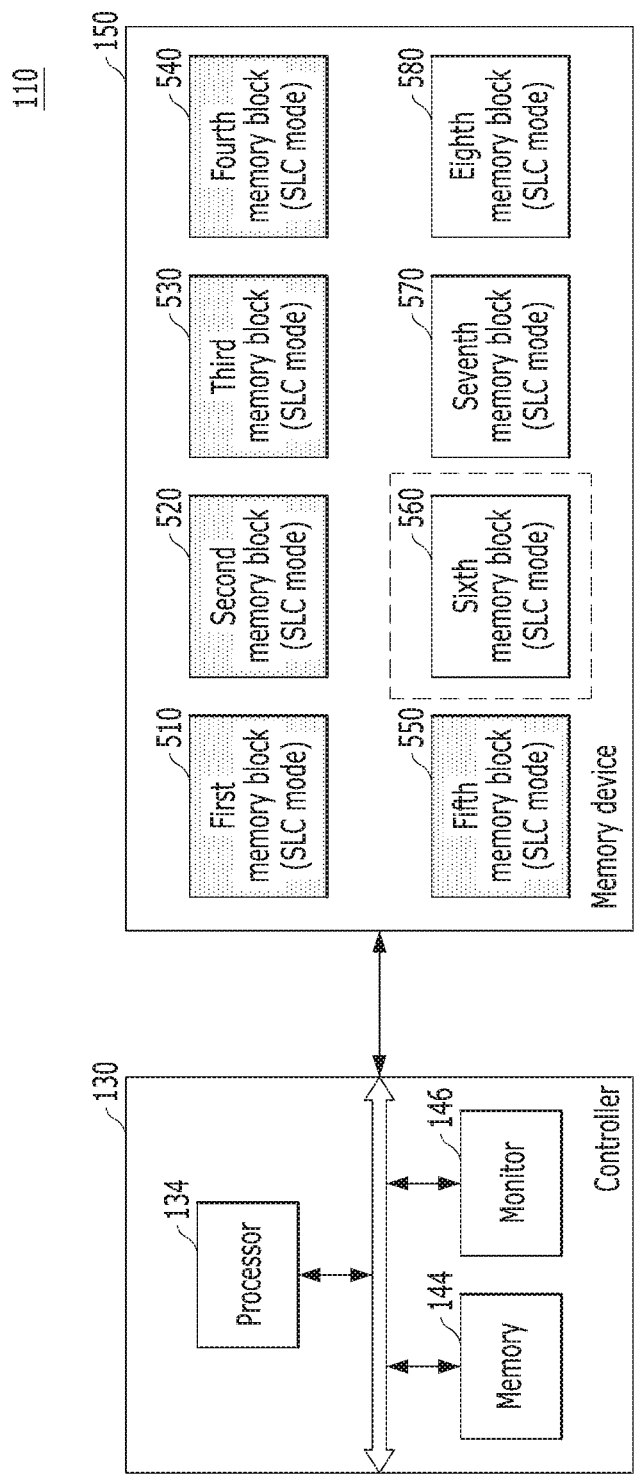
FIGS. 5A to 5C are diagrams illustrating an operation of a memory system, e.g., the memory system of FIG. 1, in accordance with an embodiment.
Figure 5B:
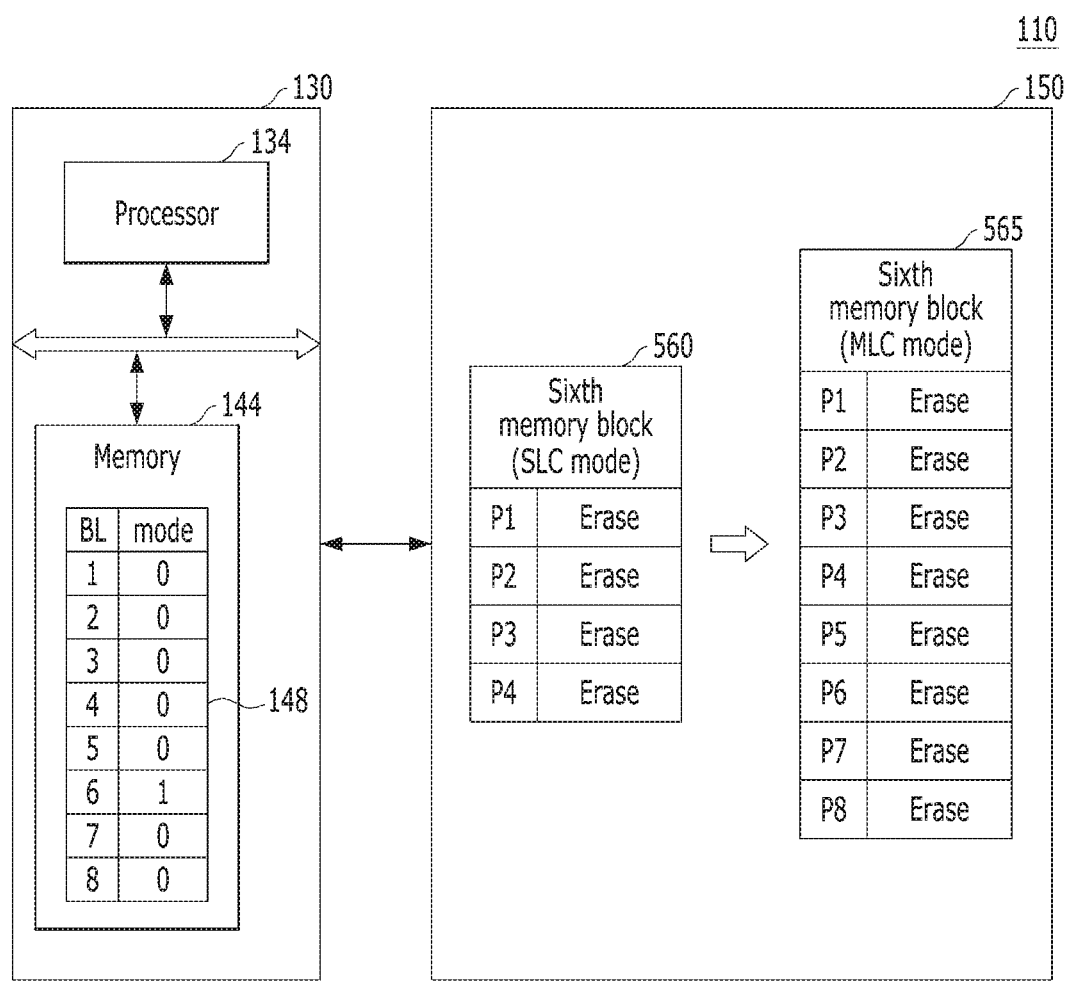
Figure 5C:
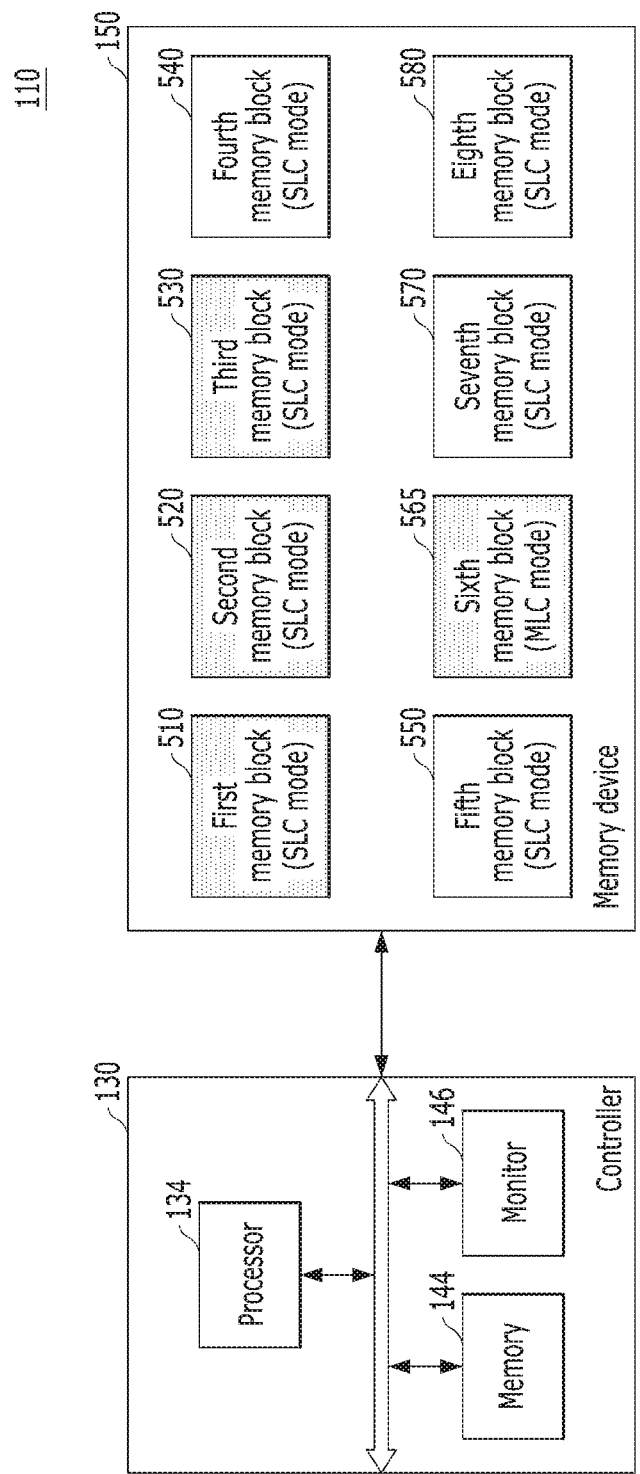

FIGS. 5A to 5C are diagrams illustrating an operation of the memory system 110 in accordance with an embodiment. In particular, FIGS. 5A to 5C illustrate only the core components of the memory system 110 in accordance with an embodiment. The memory device 150 may include a plurality of memory blocks to support the SLC mode and the MCL mode. However, this is only an example; the present invention is not limited thereto.

The memory device 150 may include a plurality of memory blocks 510 to 580. The processor 134 may control the memory device 150 to process a program command provided from the host 102. When the initial capacity of the memory device 150 is less than a first threshold value, the processor 134 may control the memory device 150 to drive the plurality of memory blocks 510 to 580 in the memory device 150 in the SLC mode. Furthermore, suppose that the entire capacity of the memory device 150 is '16G', and the first threshold value is '5 GB'. The entire capacity of the memory device 150 may indicate a capacity which is measured when the plurality of memory blocks in the memory device 150 are all driven in the MLC mode.

Referring to FIG. 5A, the processor 134 has stored data in the first to fifth memory blocks 510 to 550 according to the SLC mode. Suppose that all of the data stored in the first to fifth memory blocks 510 to 550 are valid data.

The monitor 146 may periodically monitor the usage of the memory device 150. When data are stored in the fifth memory block 550, the monitor 146 may measure the memory usage of the memory device 150 as '5 GB'.

Then, the processor 134 may select one or more of the memory blocks which are not currently used, as a victim block, in order to secure a memory block driven in the MLC mode. That is, the processor 134 may select one or more of the sixth to eighth memory blocks 560 to 580 as a victim block. Suppose, for example, that the processor 134 has selected the sixth memory block 560 as a victim block.

In the present embodiment, the processor 134 may select a victim memory block among free memory blocks. However, when there are no free memory blocks, the processor 134 may select victim memory blocks in descending order of the amounts of invalid data stored therein. Furthermore, when there are memory blocks having the same amount of invalid data stored therein, the processor 134 may select a cold block as a victim memory block.

Referring to FIG. 5B, the processor 134 may control the memory device 150 to switch the sixth memory block 560 from the SLC mode to the MLC mode. Simultaneously, the processor 134 may change the mode state of the sixth memory block 560 in a bitmap 148 of the memory 144. Specifically, when the mode state value of the sixth memory block 560 was '0' in the case that the sixth memory block 560 was driven in the SLC mode, the processor 134 may change the mode state value of the sixth memory block 560 in the bitmap 148 to '1' in the case that the sixth memory block 560 is switched to the MLC mode. The sixth memory block 565 switched to the MLC mode may include twice as many logical pages as the sixth memory block 560 driven in the SLC mode.

Referring to FIG. 5C, the processor 134 may control the memory device 150 to store some pieces of the data, which are stored in the first to fifth memory blocks 510 to 550, into the sixth memory block 565. In particular, the processor 134 may control the memory device 150 to store data in the sixth memory block 565, the data being stored in a cold block which is determined based on access information, among the data stored in the first to fifth memory blocks 510 to 550. Suppose, for example, that the fourth and fifth memory blocks 540 and 550 are cold blocks.

Specifically, the memory device 150 may temporarily load cold data, which is stored in the fourth and fifth memory blocks 540 and 550, to the page buffers 322 to 326 within the read/write circuit 320, under control of the processor 134. Then, the memory device 150 may program the loaded cold data to the sixth memory block 565 switched to the MLC mode, under control of the processor 134. In order to program the cold data loaded in the page buffers to the sixth memory block 565, the voltage supply 310 within the memory device 150 may generate first to $(2^N-1)^{th}$ program voltages, and the read/write circuit 320 may program the data to the sixth memory block 565 within the memory cell array 330, using the generated first to $(2^N-1)^{th}$ program voltages. Here, 'N' represents the number of bits which can be stored in a memory cell operated in the XLC mode. In the MLC mode, 'N' is '2', and in the TLC mode, 'N' is '3'. Therefore, 'N' in FIG. 5C is '2'. Furthermore, when the transfer of the cold data from the fourth and fifth memory blocks 540 and 550 to the sixth memory block 565 is completed, the processor 134 may control the memory device 150 to erase the data stored in the fourth and fifth memory blocks 540 and 550.

Figure 6:
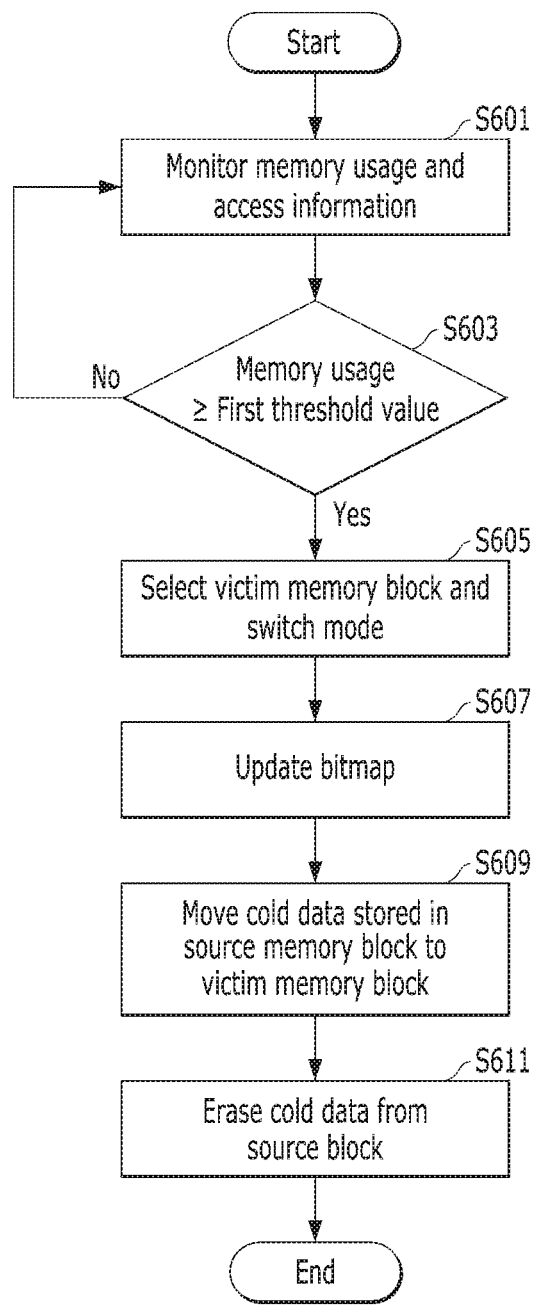
FIG. 6 is a flowchart illustrating an operation of a memory system, e.g., the memory system of FIG. 1, in accordance with an embodiment.

FIG. 6 is a flowchart illustrating the operation of the memory system 110 in accordance with an embodiment. By way of example, FIG. 6 illustrates the operation of the memory system 110, which has been described with reference to FIGS. 5A to 5C.

Referring to FIG. 6, in step S601, the monitor 146 may monitor the memory usage of the memory device 150 and the access information of the plurality of memory blocks in the memory device 150. Although the monitoring operation is described in step S601, the monitor 146 may periodically perform the monitoring operation.

In step S603, the monitor 146 may compare the memory usage of the memory device 150 to the first threshold value.

When the memory usage is less than the first threshold value ('No' in step S603), the procedure may return to step S601, and the monitor 146 may perform the monitoring operation.

On the other hand, when the memory usage is greater than or equal to the first threshold value ('Yes' in step S603), the processor 134 may select each of one or more of free memory blocks as a victim memory block in step S605. The processor 134 may switch the selected victim memory block(s) from the SLC mode to the MLC mode.

In step S607, the processor 134 may update a bit value corresponding to the mode-switched victim memory block in the bitmap stored in the memory 144.

In step S609, the processor 134 may move cold data stored in a source memory block to the victim memory block. For example, as shown in FIG. 5C, the processor 134 may move the cold data stored in the fourth and fifth memory blocks 540 and 550 to the sixth memory block 565.

In step S611, the processor 134 may erase the cold data which have been stored in the source memory block.

Figure 7A:
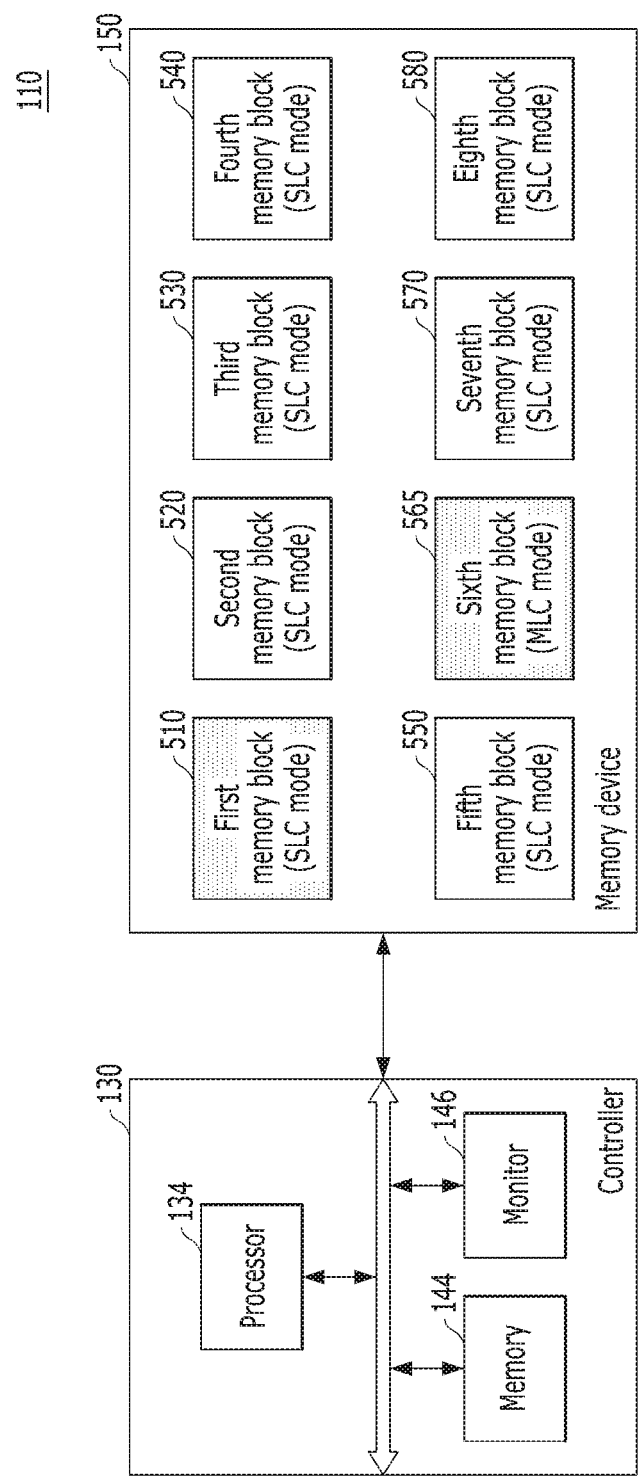
FIGS. 7A to 7C are diagrams illustrating an operation of a memory system, e.g., the memory system of FIG. 1, in accordance with an embodiment.
Figure 7B:
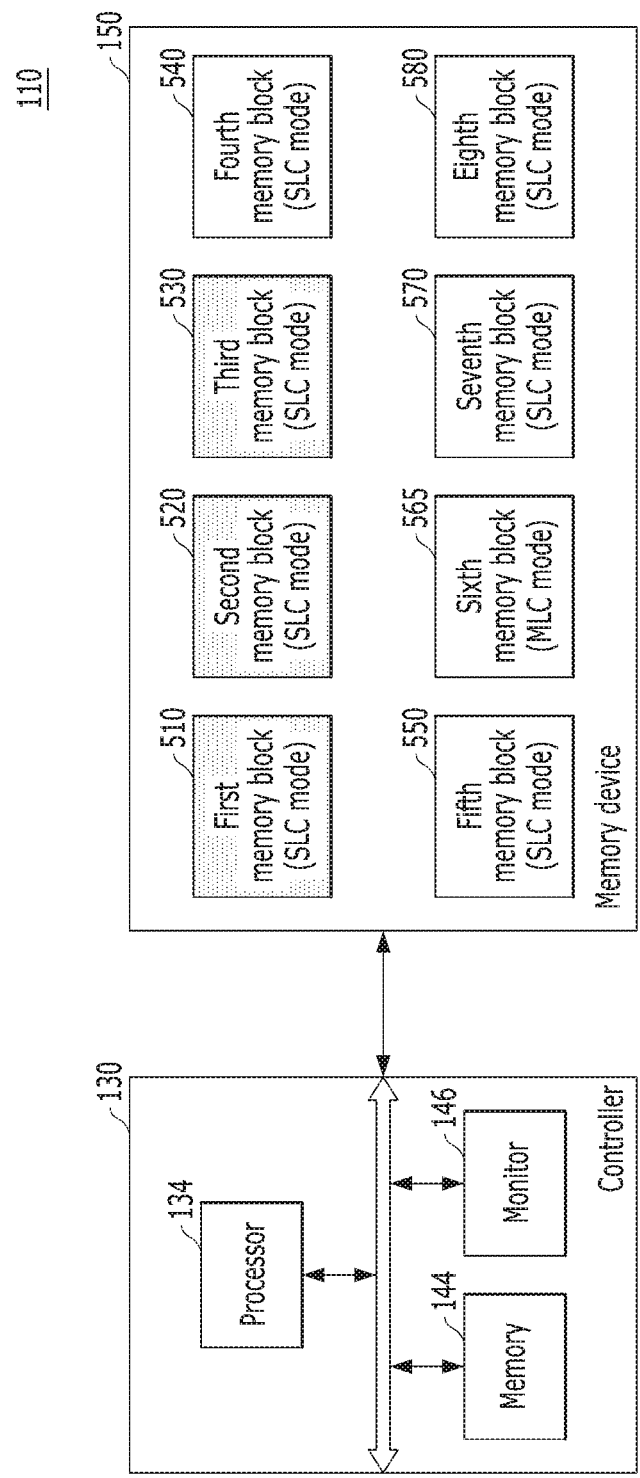
Figure 7C:
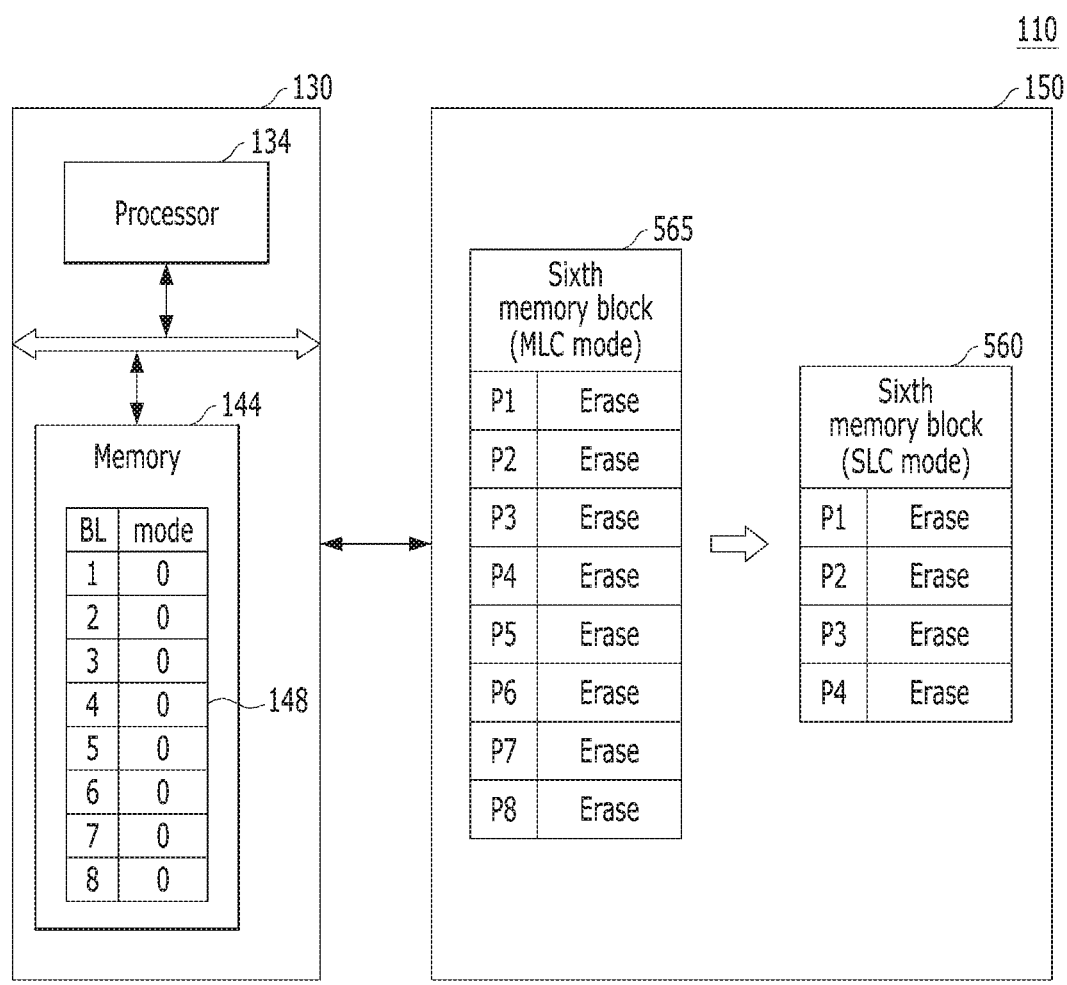

FIGS. 7A to 7C are diagrams illustrating an operation of the memory system 110 in accordance with an embodiment. In particular, FIGS. 7A to 7C illustrate only the core components of the memory system 110 in accordance with an embodiment. In this example, the memory device 150 may include a plurality of memory blocks to support the SLC mode and the MCL mode as illustrated in FIGS. 5A to 5C. FIG. 5C illustrates that the second and third memory blocks 520 and 530 have data stored therein. In contrast, FIG. 7A is based on the supposition that the data stored in the second and third memory blocks 520 and 530 were erased.

Suppose that the entire capacity of the memory device 150 is '16 GB', and the second threshold value is '3 GB'. The entire capacity of the memory device 150 may indicate a capacity which is measured when the plurality of memory blocks in the memory device 150 are all driven in the MLC mode.

Referring to FIG. 7A, data may be stored in only the first and sixth memory blocks 510 and 560 among the memory blocks in the memory device 150. The monitor 146 may measure the current memory usage of the memory device 150 as '3 GB'. Then, the monitor 146 may compare the current memory usage to the second threshold value. Since the current memory usage of '3 GB' is equal to the second threshold value of '3 GB', the processor 134 may switch the mode of the sixth memory block 565 driven in the MLC mode, in order to secure a memory block driven in the SLC mode.

Referring to FIG. 7B, the processor 134 may control the memory device 150 to store the data stored in the sixth memory block 565 into the second and third memory blocks 520 and 530.

Specifically, the memory device 150 may temporarily load the data stored in the sixth memory block 565 to the page buffers 322 to 326 within the read/write circuit 320, under control of the processor 134. Then, the memory device 150 may program the loaded data to the second and third memory blocks 520 and 530 driven in the SLC mode, under control of the processor 134. In order to program the data loaded in the page buffers to the second and third memory blocks 520 and 530, the voltage supply 310 within the memory device 150 may generate first to $(2^N-1)^{th}$ program voltages, and the read/write circuit 320 may program the data to the second and third memory blocks 520 and 530 within the memory cell array 330, using the generated first to $(2^N-1)^{th}$ program voltages. Since the second and third memory blocks 520 and 530 are driven in the SLC mode, 'N' is '1'. Furthermore, when the transfer of the data from the sixth memory block 565 to the second and third memory blocks 520 and 530 is completed, the processor 134 may control the memory device 150 to erase the data stored in the sixth memory block 565.

Referring to FIG. 7C, the processor 134 may control the memory device 150 to switch the sixth memory block 565 from the MLC mode to the SLC mode. Simultaneously, the processor 134 may change the mode state of the sixth memory block 565 in the bitmap 148 stored in the memory. Specifically, when the mode state value of the sixth memory block 565 was '1' in the case the sixth memory block 565 was driven in the MLC mode, the processor 134 may change the mode state value of the sixth memory block 565 in the bitmap 148 to '0' in the case that the sixth memory block 565 is switched to the SLC mode.

Figure 8:
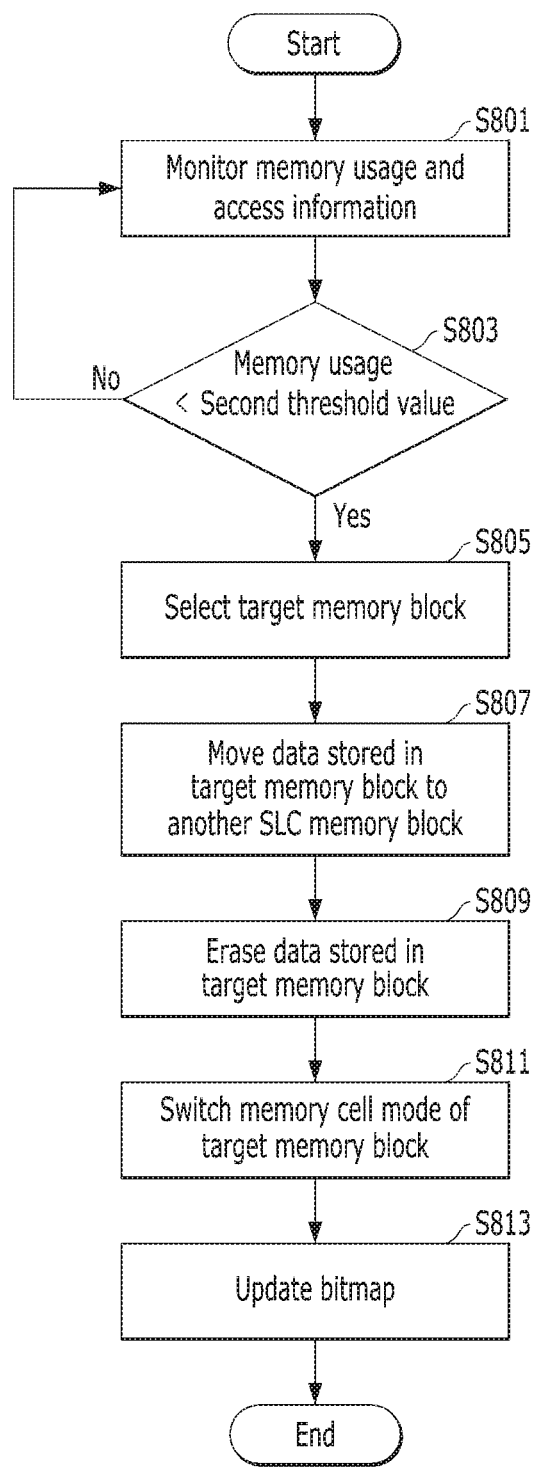
FIG. 8 is a flowchart illustrating an operation of a memory system, e.g., the memory system of FIG. 1, in accordance with an embodiment.

FIG. 8 is a flowchart illustrating the operation of the memory system 110 in accordance with an embodiment. By way of example, FIG. 8 illustrates the operation of the memory system 110, which has been described with reference to FIGS. 7A to 7C.

Referring to FIG. 8, in step S801, the monitor 146 may monitor the memory usage of the memory device 150 and the access information of the plurality of memory blocks in the memory device 150. Although the monitoring operation is described in step S801, the monitor 146 may periodically perform the monitoring operation.

In step S803, the monitor 146 may compare the memory usage of the memory device 150 to the second threshold value.

When the memory usage is greater than or equal to the second threshold value ('No' in step S803), the procedure may return to step S801, and the monitor 146 may perform the monitoring operation.

When the memory usage is less than the second threshold value ('Yes' in step S803), the processor 134 may select a target memory block driven in the MLC mode in step S805.

In step S807, the processor 134 may move data stored in the target memory block to another SLC memory block. For example, as shown in FIG. 7B, the processor 134 may move the data stored in the sixth memory block 565 to the second and third memory blocks 520 and 530.

In step S809, the processor 134 may erase the data which have been stored in the target memory block.

In step S811, the processor 134 may switch the target memory block from the MLC mode to the SLC mode.

In step S813, the processor 134 may update a bit value corresponding to the mode-switched target memory block in the bitmap stored in the memory 144.

As described above, the memory system 110 may move data between the SLC memory block and the XLC memory block, thereby utilizing the advantages of the SLC memory block and the XLC memory block. As a result, the memory system 110 in accordance with an embodiment may extend the lifetime of the memory device 150 and thus improve the performance of the memory system 110.

FIGS. 9 to 17 are diagrams schematically illustrating application examples of the data processing system of FIGS. 1 to 8 according to various embodiments.

Figure 9:
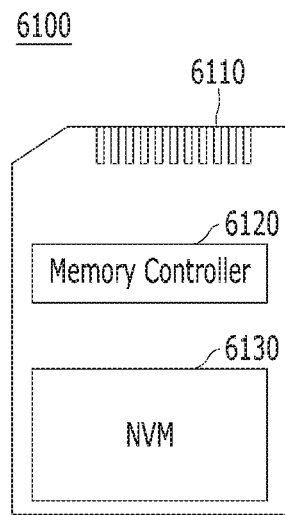
FIGS. 9 to 17 are schematic diagrams illustrating application examples of a data processing system, in accordance with various embodiments of the present invention.

FIG. 9 is a diagram schematically illustrating the data processing system including the memory system in accordance with an embodiment. By way of example, FIG. 9 illustrates a memory card system 6100 to which the memory system in accordance with an embodiment is applied.

Referring to FIG. 9, the memory card system 6100 may include a memory controller 6120, a memory device 6130 and a connector 6110.

The memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

As shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols, such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by any of various nonvolatile memory devices, such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state drive (SSD). For another example, the memory controller 6120 and the memory device 6130 may form a memory card, such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., miniSD card, microSD card and SDHC card) and/or a universal flash storage (UFS).

Figure 10:
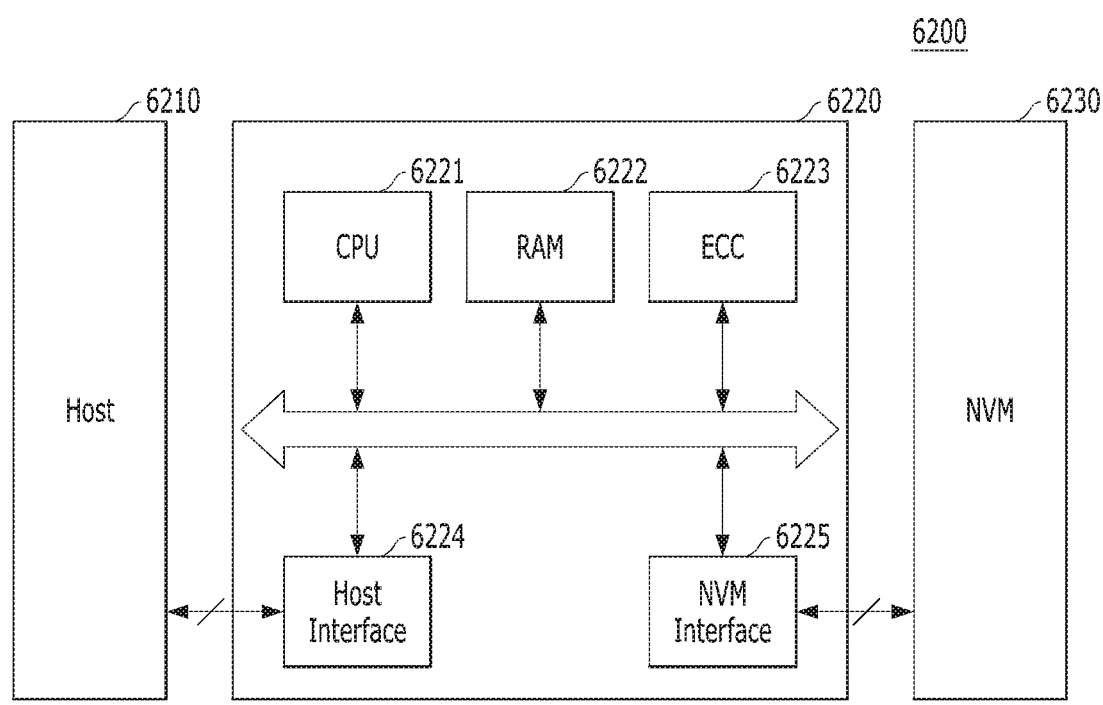

FIG. 10 is a diagram schematically illustrating another example of a data processing system 6200 including the memory system in accordance with an embodiment.

Referring to FIG. 10, the data processing system 6200 may include a memory device 6230 having one or more nonvolatile memories (NVMs) and a memory controller 6220 for controlling the memory device 6230. The data processing system 6200 may serve as a storage medium such as a memory card (CF card, SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then transmit and/or receive data to and/or from the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device.

Figure 11:
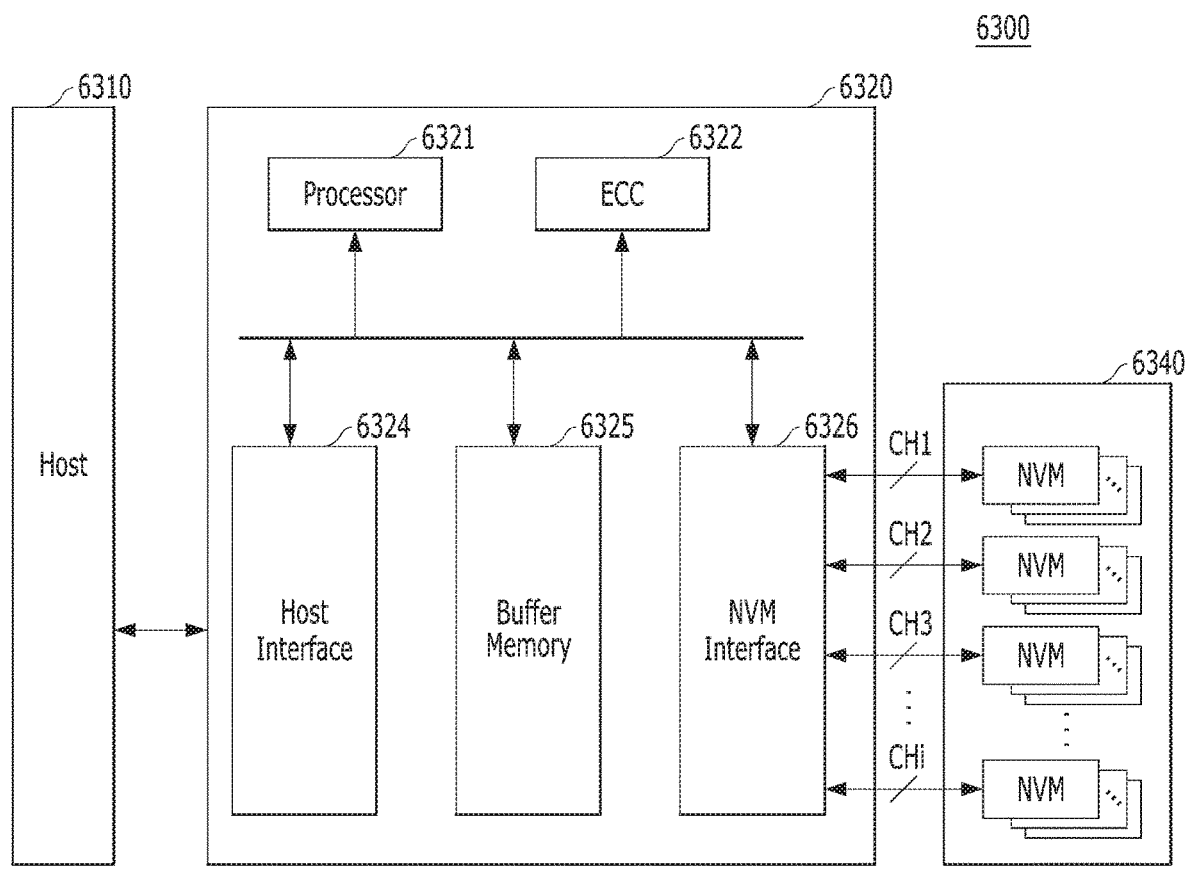

FIG. 11 is a diagram schematically illustrating another example of the data processing system including the memory system in accordance with an embodiment. By way of example, FIG. 10 illustrates a solid state drive (SSD) 6300 to which the memory system may be applied.

Referring to FIG. 11, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

The controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

Figure 12:
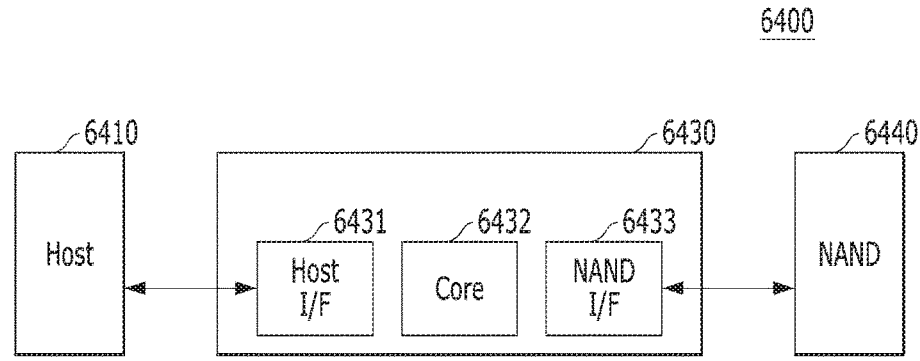

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories, such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and/or phase-change RAM (PRAM). By way of example, FIG. 12 illustrates that the buffer memory 6325 is disposed in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device

6340 based on the ECC value during a read operation, and perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

FIG. 12 is a diagram schematically illustrating another example of the data processing system including the memory system in accordance with an embodiment. By way of example, FIG. 12 illustrates an embedded Multi-Media Card (eMMC) 6400 to which the memory system may be applied.

Referring to FIG. 12, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

The controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

FIGS. 13 to 16 are diagrams schematically illustrating other examples of the data processing system including the memory system in accordance with one or more embodiments. By way of example, FIGS. 13 to 16 illustrate universal flash storage (UFS) systems to which the memory system may be applied.

Referring to FIGS. 13 to 16, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 9 to 11, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal serial bus (USB) Flash Drives (UFDs), multi-media card (MMC), secure digital (SD), mini-SD, and micro-SD.

Figure 13:
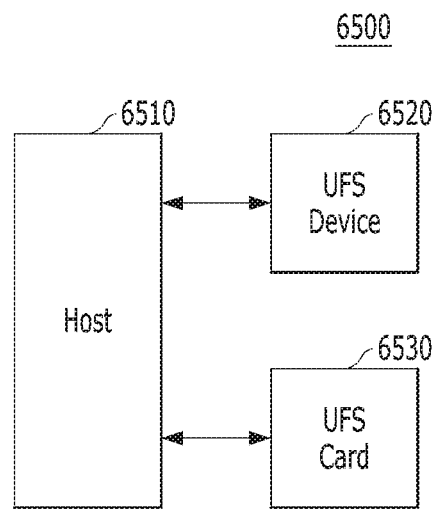

In the UFS system 6500 illustrated in FIG. 13, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In FIG. 13, the configuration in which one UFS device 6520 and one UFS card 6530 are connected to the host 6510 is illustrated by way of example. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 14:
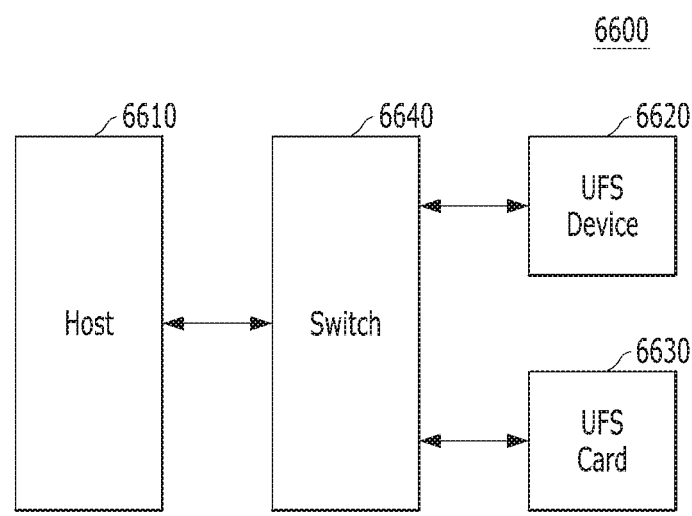

In the UFS system 6600 illustrated in FIG. 14, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In FIG. 14, the configuration in which one UFS device 6620 and one UFS card 6630 are connected to the switching module 6640 is illustrated by way of example. However, a plurality of UFS devices and UFS cards may be connected in parallel or in the form of a star to the switching module 6640, and a plurality of UFS cards may be connected in series or in the form of a chain to the UFS device 6620.

Figure 15:
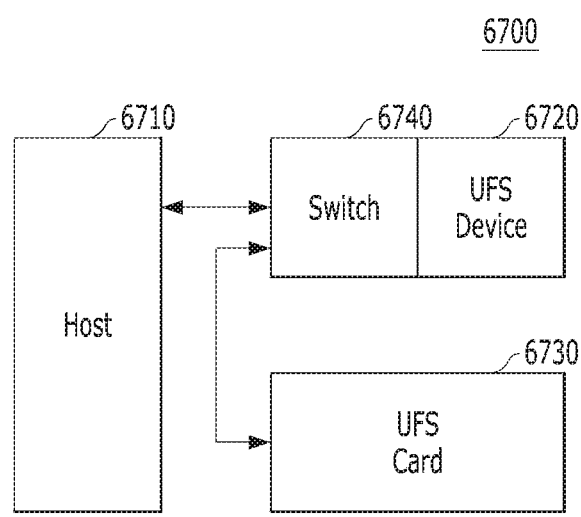

In the UFS system 6700 illustrated in FIG. 15, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In FIG. 15, the configuration in which one UFS device 6720 and one UFS card 6730 are connected to the switching module 6740 is illustrated by way of example. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 16:
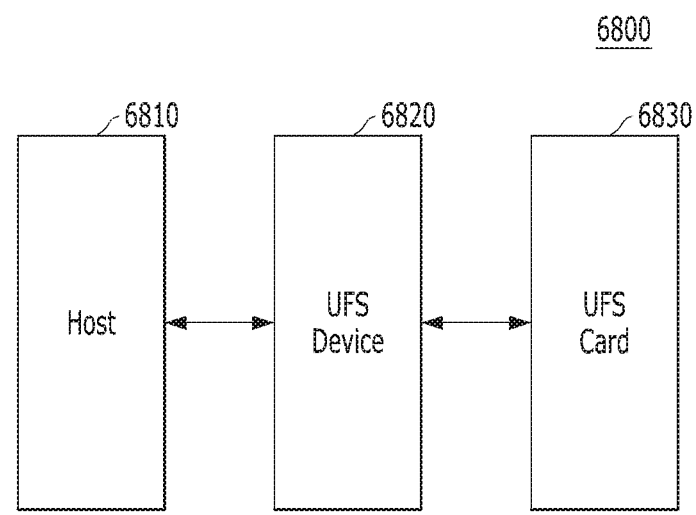

In the UFS system 6800 illustrated in FIG. 16, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In FIG. 16, the configuration in which one UFS device 6820 is connected to the host 6810 and one UFS card 6830 is connected to the UFS device 6820 is illustrated by way of example. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 17:
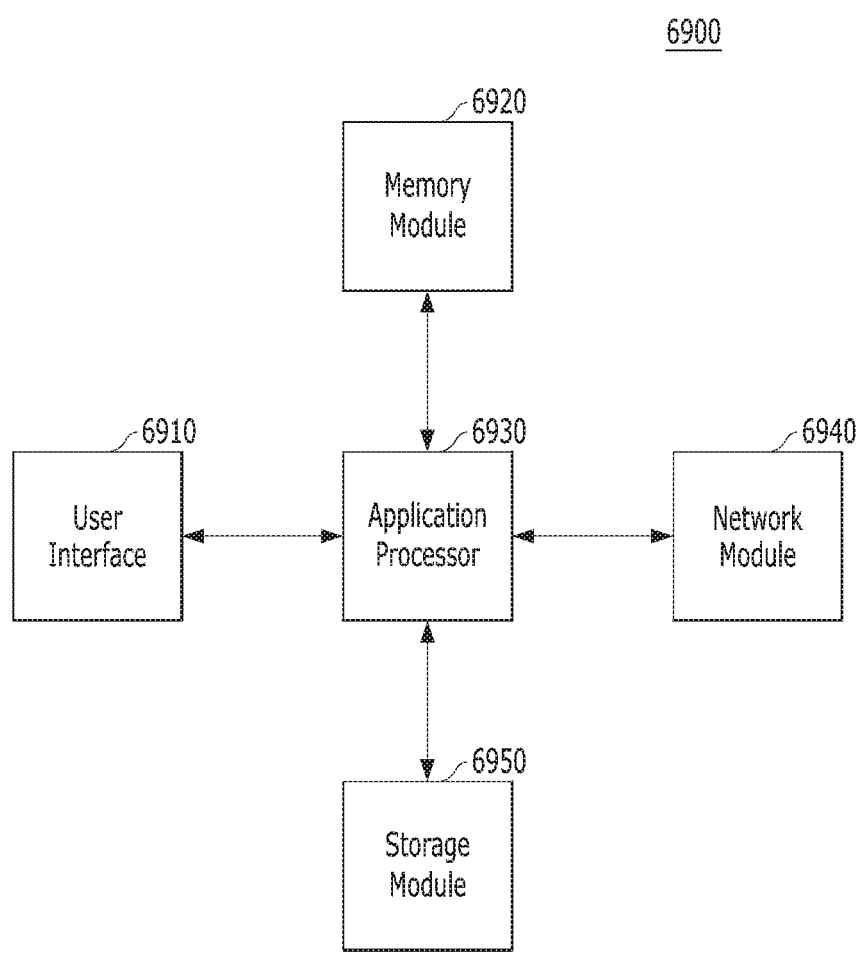

FIG. 17 is a diagram schematically illustrating another example of the data processing system including the memory system in accordance with an embodiment. By way of example, FIG. 17 is a diagram illustrating a user system 6900 to which the memory system may be applied.

Referring to FIG. 17, the user system 6900 may include a user interface 6910, a memory module 6920, an application processor 6930, a network module 6940, and a storage module 6950.

The application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 11 to 16.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

Although various embodiments have been illustrated and described, it will be apparent to those skilled in the art in light of the present disclosure that various changes and modifications may be made without departing from the spirit and scope of the invention as defined in the following claims. The invention encompasses all such variations and modifications to the extent they fall within the scope of the claims.

What is claimed is:

1. A memory system comprising:
a memory device including a plurality of memory blocks, which includes memory cells supporting a two-or-more-level cell (XLC) mode and a single level cell (SLC) mode; and
a controller suitable for managing data of the memory device and controlling the memory device,
wherein, when memory usage of the memory device is greater than or equal to a first threshold value, the controller selects one or more free memory blocks as one or more victim memory blocks, switches a mode of each victim memory block to the XLC mode, and moves data stored in a source memory block to the one or more victim memory blocks,
wherein the source memory block, among the plurality of memory blocks, has data stored therein driven in the SLC mode,
wherein, when the memory usage of the memory device changes and is less than a second threshold value, which is less than the first threshold value, the controller selects at least one target memory block among the memory blocks switched to the XLC mode, moves data stored in the at least one target memory block to one or more free memory blocks, and changes a mode of the at least one target memory block from the XLC mode to the SLC mode,
wherein, when there are no free memory blocks, the controller selects one or more memory blocks as the one or more victim memory blocks in a descending order of amounts of invalid data stored in the plurality of memory blocks, and
wherein, when there are memory blocks having the same amount of the invalid data stored in the plurality of memory blocks, the controller selects a cold memory block among the plurality of memory blocks as the one victim memory block.

2. The memory system of claim 1, wherein the controller comprises:
a monitor suitable for monitoring the memory usage of the memory device and access information of the plurality of memory blocks;
a memory suitable for storing a bitmap indicating modes of the plurality of memory blocks; and
a processor suitable for switching the mode of each victim memory block and controlling data transfer between the controller and each victim memory block.

3. The memory system of claim 2, wherein the monitor stores usage of valid regions of the plurality of memory blocks, and stores access information of memory blocks corresponding to the valid regions among the plurality of memory blocks.

4. The memory system of claim 2, wherein the controller drives the plurality of memory blocks in the SLC mode, when the memory device is reset.

5. The memory system of claim 2, wherein, when each victim memory block is switched from the SLC mode to the XLC mode, the processor updates a bit value for the corresponding victim memory block and stores each updated bit value in the bitmap.

6. The memory system of claim 1, wherein, when the at least one target memory block is switched from the XLC mode to the SLC mode, the controller updates at least one bit value each indicating a mode of corresponding memory block for the at least one target memory block and stores the bit value in a bitmap.

7. The memory system of claim 1, wherein the controller determines cold blocks among the plurality of memory blocks driven in the SLC mode, moves data stored in the cold blocks to the one or more victim memory blocks, and erases data stored in the cold blocks.

8. The memory system of claim 7, wherein the cold blocks are determined based on access information corresponding to the plurality of memory blocks.

9. An operation method of a memory system which includes a memory device including a plurality of memory blocks, which includes memory cells supporting a two-or-more-level cell (XLC) mode and a single level cell (SLC) mode, and a controller suitable for controlling the memory device, the operation method comprising:
monitoring memory usage of the memory device and access information of the plurality of memory blocks;
selecting one or more free memory blocks as one or more victim memory blocks, when the memory usage is greater than or equal to a first threshold value;
switching a mode of each of the one or more victim memory blocks from the SLC mode to the XLC mode;
moving data stored in a source memory block to the one or more victim memory blocks;
selecting at least one target memory block among the memory blocks switched to the XLC mode, when the memory usage of the memory device changes and is less than a second threshold value, which is less than the first threshold value;
moving data stored in the at least one target memory block to one or more free memory blocks driven in the SLC mode;
switching a mode corresponding to the at least one target memory block from the XLC mode to the SLC mode;
selecting one or more memory blocks as the one or more victim memory blocks in a descending order of amounts of invalid data stored in the plurality of memory blocks when there are no free memory blocks; and
selecting a cold memory block among the plurality of memory blocks as the one victim memory block when there are memory blocks having the same amount of the invalid data stored in the plurality of memory blocks.

10. The operation method of claim 9, further comprising storing a bitmap indicating modes of the plurality of memory blocks.

11. The operation method of claim 10, further comprising updating a bit value for each victim memory block and storing each updated bit value in the bitmap, when the corresponding victim memory block is switched from the SLC mode to the XLC mode.

12. The operation method of claim 10, further comprising updating a bit value which corresponds to the at least one target memory block and is stored in the bitmap, when the at least one target memory block is switched from the XLC mode to the SLC mode.

13. The operation method of claim 9, wherein the monitoring of the memory usage of the memory device and the access information of the plurality of memory blocks comprises storing usage of valid regions of the plurality of memory blocks, and storing access information of memory blocks corresponding to the valid regions among the plurality of memory blocks.

14. The operation method of claim 9, further comprising driving the plurality of memory blocks in the SLC mode, when the memory device is reset.

15. The operation method of claim 9, further comprising:
  determining cold blocks among the memory blocks driven in the SLC mode; and
  moving data stored in the cold blocks to the one or more victim memory blocks, and erasing the data stored in the cold blocks.

16. A memory system comprising:
  a memory device including a plurality of memory blocks, which includes memory cells supporting a two-or-more-level cell (XLC) mode and a single level cell (SLC) mode; and
  a controller suitable for:
  controlling the memory blocks to be operated in the SLC mode; and
  when valid data of the memory blocks is greater than a threshold value, controlling at least one free block of the memory blocks to be operated in the XLC mode; and
  when the valid data of the memory blocks changes and is less than a second threshold value, which is less than the first threshold value, controlling at least one free block operated in the XLC mode to be operated in the SLC mode,
  wherein, when there are no free blocks, the controller selects one or more memory blocks to be operated in the XLC mode in a descending order of amounts of invalid data stored in the plurality of memory blocks, and
  wherein, when there are memory blocks having the same amount of the invalid data stored in the plurality of memory blocks, the controller selects a cold memory block to be operated in the XLC mode among the plurality of memory blocks.

* * * * *